United States Patent
Gramer

[11] Patent Number: 5,957,526
[45] Date of Patent: Sep. 28, 1999

[54] FLOOR STRUCTURE FOR AN AUTOMOBILE

[75] Inventor: Engelbert Gramer, Eutingen, Germany

[73] Assignee: Mercedes-Benz AG, Stuttgart, Germany

[21] Appl. No.: 08/859,247

[22] Filed: May 20, 1997

[30] Foreign Application Priority Data

May 31, 1996 [DE] Germany .......................... 196 21 949

[51] Int. Cl.[6] .................................................. B62D 25/20
[52] U.S. Cl. .......................................... 296/204; 296/37.8
[58] Field of Search ................................. 296/204, 208, 296/37.8; 180/336; 280/735

[56] References Cited

U.S. PATENT DOCUMENTS

| | | | |
|---|---|---|---|
| 2,230,448 | 2/1941 | Best | 296/204 |
| 3,366,411 | 1/1968 | Vittone | 296/204 |
| 3,919,926 | 11/1975 | Yamada . | |
| 4,690,241 | 9/1987 | Miyadera | 296/37.8 X |
| 5,085,481 | 2/1992 | Fluharty et al. | 296/37.8 |
| 5,112,094 | 5/1992 | Kribs | 296/37.8 |
| 5,129,700 | 7/1992 | Trevisan et al. | 296/204 X |
| 5,609,382 | 3/1997 | Schmid et al. | 296/37.8 |

FOREIGN PATENT DOCUMENTS

| | | | |
|---|---|---|---|
| 38 09 185 C2 | 10/1988 | Germany . | |
| 224839 | 10/1991 | Japan | 296/37.8 |

*Primary Examiner*—Joseph D. Pape
*Attorney, Agent, or Firm*—Evenson, McKeown, Edwards & Lenahan, P.L.L.C.

[57] ABSTRACT

A floor structure for an automobile particularly an automobile without a center tunnel. A one-piece plate-shaped middle part is incorporated into the floor structure to provide reinforcement in a middle functional area. Receptacles for a plurality of vehicle functional parts are integrally mounted on the middle part.

16 Claims, 2 Drawing Sheets

5,957,526

FLOOR STRUCTURE FOR AN AUTOMOBILE

BACKGROUND AND SUMMARY OF THE INVENTION

This application claims the priority of German Application No. 19621949.3, the disclosure of which is expressly incorporated by reference herein.

The invention relates to a floor structure for an automobile, said structure extending over at least the entire bottom of a passenger compartment and comprising a plurality of functional areas.

A floor structure for a motor vehicle is known from German Patent Document DE 38 09185 C2. The known floor structure is built up sandwichwise, with a honeycomb core being provided between an upper floor part and a lower floor part. The upper floor part has a center tunnel in the area of the passenger compartment, to the bottom of which tunnel hose lines and bearings for transmission rods are fastened by means of a multipartite sheet metal design.

A goal of the invention is to provide a floor structure of the type generally described at the outset that has sufficient rigidity without a center tunnel and sufficient mounting provisions for vehicle functional parts in the vicinity of the center of the vehicle.

This and other goals have been achieved according to the present invention by providing a floor structure for an automobile, said floor structure extending over the entire bottom of a passenger compartment and having a plurality of functional areas, wherein a one-piece plate-shaped middle part is connected to a central area of said floor structure, a plurality of receptacles being incorporated into said middle part, said receptacles including a bracket for a hand brake lever, a receptacle for an airbag sensor, and a holder for a shift housing, said holder including at least three mounting pots spaced apart from one another, said mounting pots being configured for connection to the shift housing, said mounting pots projecting upward from a floor plate of the middle part to define an accommodation space therebetween for at least one cable duct below the shift housing.

The middle part thus constitutes a multifunctional part since accommodations are provided for a plurality of vehicle functional parts. Because of the separate design and incorporation of the middle part into the floor structure, the latter, even without the provision of a center tunnel, has sufficient rigidity over its entire surface to permit in particular a safe and comfortable function of vehicle functional parts such as a hand brake and gearshift. Separate mounting of the various accommodations is eliminated by the one-piece arrangement on the middle part so that much faster and simpler assembly on the middle part so that much faster and simpler assembly of the corresponding vehicle functional parts in the middle functional area is made possible. The floor element according to the invention strengthens the middle area of the floor structure and hence the main floor, and absorbs oscillation, bending, and torsional forces. At the same time, the forces that occur as a result of the actuation of the vehicle functional parts in the middle functional area are absorbed without the main floor, i.e., the floor structure, being stressed by these forces.

In designing the invention, a bracket for a manual lever of a hand brake, a holder for a shift housing, and a receptacle for a sensor for an airbag unit are provided on the middle part. A particular advantage of the solution according to the invention is the fact that the various vehicle functional parts can be mounted in advance on the middle part and then the middle part can be added to the floor structure. Mounting the manual lever of the hand brake, shift housing, and sensor for the airbag unit in the central functional area integrates all the important functional parts in the middle part.

In another embodiment of the invention, at least three mounting pots spaced apart from one another are provided as receptacles for the shift housing, to which pots the shift housing is fastenable, said pots projecting upward from the floor panel sufficiently to allow at least one cable duct to be laid between the mounting pots and below the shift housing. Before the installation of the shift console or shift housing, a free space that is freely accessible is available between the mounting pots for inserting the cable ducts. As a result, it is possible to install the cable duct from above, making assembly easy.

As a result of the arrangement of the mounting pots, the cable duct is already exactly aligned and positioned.

In another embodiment of the invention, the middle part is provided with stiffeners whose positions and dimensions are adjusted to the stiffening design of the entire floor structure. The middle part thus reinforces the middle area of the main floor and also contributes to stiffening the entire floor structure.

Other objects, advantages and novel features of the present invention will become apparent from the following detailed description of the invention when considered in conjunction with the accompanying drawings.

DETAILED DESCRIPTION OF THE DRAWINGS

Figure 1:
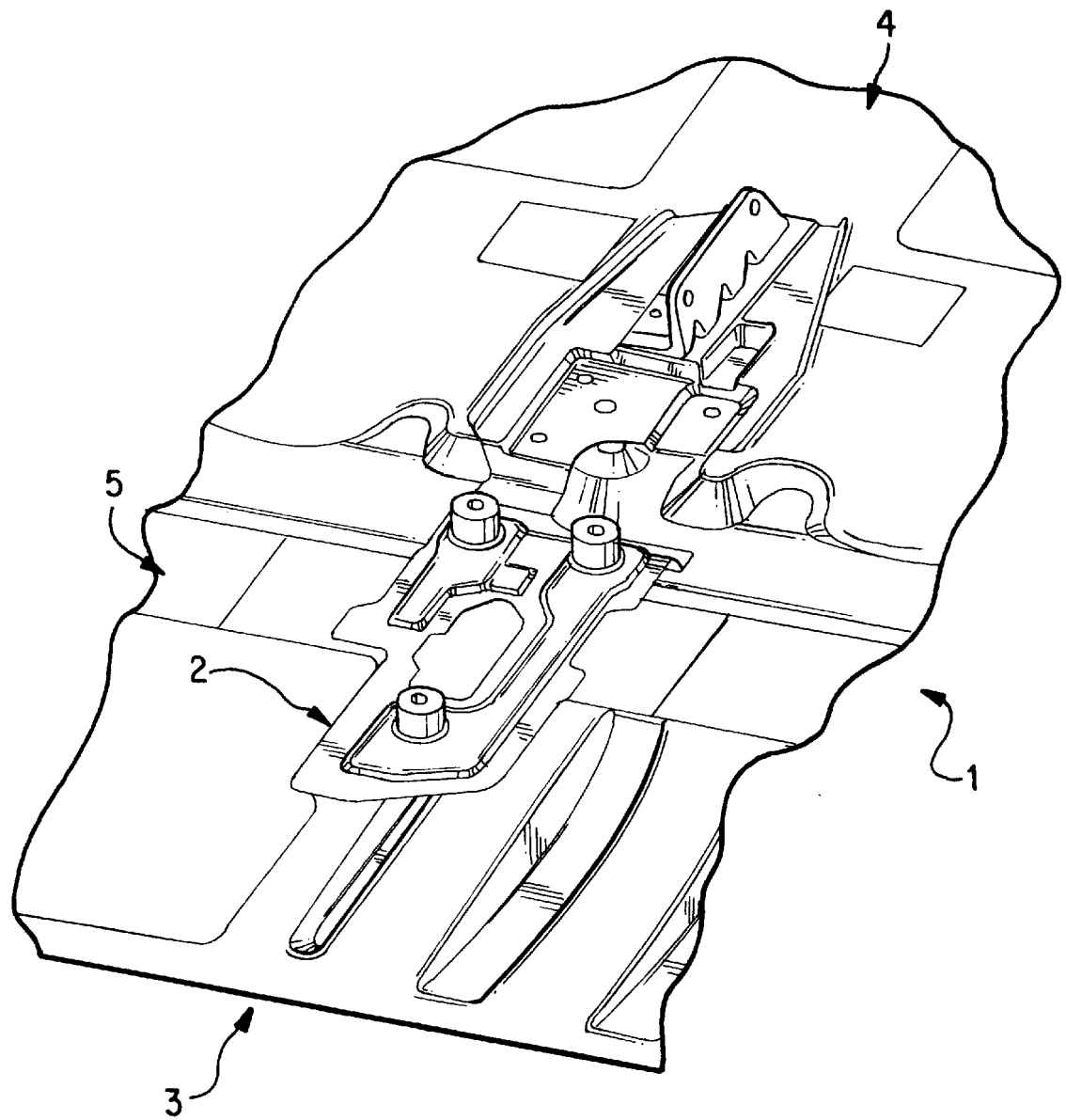
FIG. 1 is a perspective view of a part of an embodiment of a floor structure according to a preferred embodiment of the present invention that is provided with a reinforcing middle element.
Figure 2:
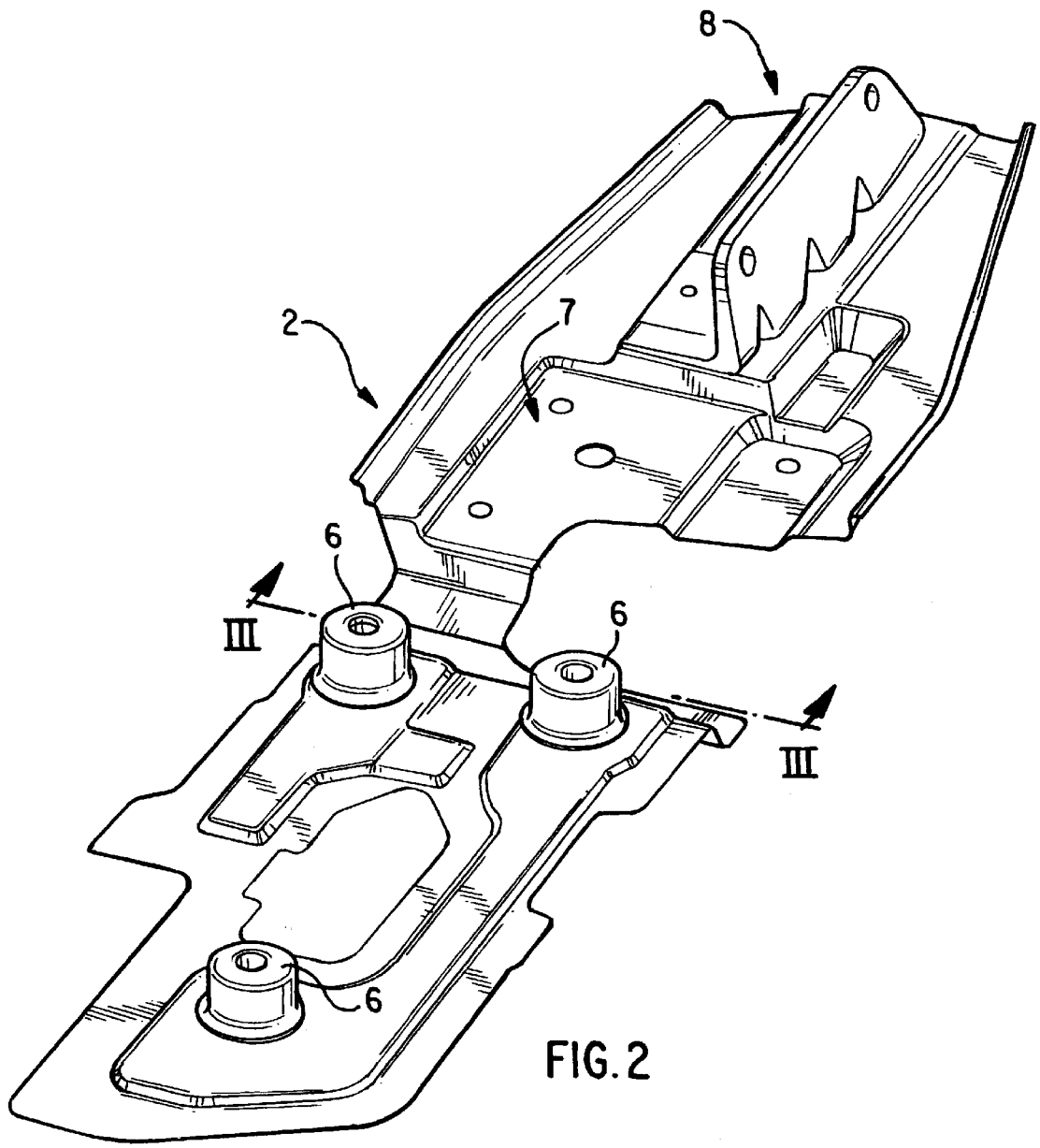
FIG. 2 is an enlarged perspective view of the middle element according to FIG. 1.
Figure 3:
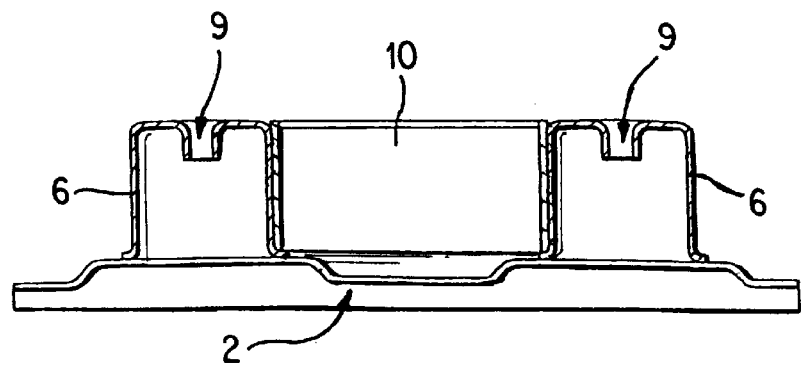
FIG. 3 is a section through the middle element at the level of two mounting pots along cutting plane III—III in FIG. 2.

According to FIG. 1, an automobile has a floor structure that is formed firstly by a plate-shaped main floor (1) and secondly by a reinforcing middle part (2) (FIGS. 2 and 3). A forward area of main floor (1) is indicated by reference numeral (3) and a rear area by reference numeral (4). At approximately the height of middle part (2), main floor (1) has a bulge (5) running transversely to receive a cross member. Middle part (2) extends at the level of the central longitudinal axis of the vehicle in the longitudinal direction of main floor (1) and is essentially plate-shaped (FIG. 2). In its front area, middle part (2), made in the form of a sheet metal structure, has a receptacle for a shift console of a center-mounted gearshift in which a connection to the transmission is provided from the shift console by means of Bowden cables through one end wall of the automobile. For this purpose, three mounting pots (6) are provided on middle part (2), said pots projecting upward from the floor plate of middle part (2) and located with spaces between them. The two rear mounting pots (6) are located at the same height while the front mounting pot (6) is positioned at a distance from the two rear mounting pots (6). As can be seen from FIG. 3, the height of mounting pots (6) is sufficient to leave a free space below the shift console. This free space can be filled by a cable duct (10), with cable duct (10) having its dimensions adjusted to the spaces between the two mounting pots (6) in such fashion that mounting pots (6) align cable duct (10) exactly relative to middle part (2) and position it securely. At a distance behind the receptacle for the shift console, middle part (2) has a receiving area (7) for a sensor of an airbag unit, which preferably can be connected with receiving area (7) by threaded connectors. In its upper end area each of the mounting pots (6) has an opening (9) provided with a thread or an embossed or welded threaded nut for securing the bolt of the shift console.

In the rear area of middle part (2) is a bracket (8) that projects upward for mounting a manual lever of a hand brake. Bracket (8) as well as mounting pots (6) in the embodiment shown are initially made in the form of separate sheet metal parts and then welded to middle part (2). Receiving area (7) is formed directly in middle part (2) by deep drawing or the like.

In addition, middle part (2) has a plurality of stiffening segments not shown in greater detail which confer a high intrinsic rigidity on middle part (2). Middle part (2) is integrated into main floor (1), and is welded to main floor (1) in the vicinity of its outer edges.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A floor structure for an automobile, said floor structure extending over the entire bottom of a passenger compartment and having a plurality of functional areas, wherein a one-piece plate-shaped middle part is connected to a central area of said floor structure, a plurality of receptacles being incorporated into said middle part, said receptacles including a bracket for a hand brake lever, a receptacle for an airbag sensor, and a holder for a shift housing, said holder including at least three mounting pots spaced apart from one another, said mounting pots being configured for connection to the shift housing, said mounting pots projecting upward from a floor plate of the middle part to define an accommodation space therebetween for at least one cable duct below the shift housing.

2. A floor structure according to claim 1, wherein said middle part is provided with stiffeners positions and dimensions are adjusted to a stiffening structure.

3. A floor structure for an automobile, comprising:
   a main floor having an upper side facing a passenger compartment;
   a one-piece middle part fixedly connected to said upper side of the main floor; and
   at least three mounting portions fixedly connected to said middle part, each of said mounting portions including an opening on an upper side thereof for connection to a shift housing, said mounting portions projecting upwardly from the middle part and being spaced apart from one another to define an accommodation space therebetween.

4. A floor structure according to claim 3, further comprising a bracket fixedly connected to said middle part, at least a portion of said bracket extending essentially perpendicularly to said upper side of the main floor, said bracket being mounted rearward of said mounting portions.

5. A floor structure according to claim 4, wherein said portion of said bracket includes at least one opening for connection to a hand brake lever.

6. A floor structure according to claim 3 further comprising a bracket fixedly connected to said middle part, at least a portion of said bracket extending essentially perpendicularly to said upper side of the main floor, said bracket being mounted rearward of said mounting portions.

7. A floor structure according to claim 3, wherein a portion of said middle part is configured as a receiving area for connection to an airbag sensor.

8. A floor structure according to claim 4, wherein a portion of said middle part is configured as a receiving area for connection to an airbag sensor, said receiving area being located between said mounting portions and said bracket.

9. A floor structure according to claim 6, wherein a portion of said middle part is configured as a receiving area for connection to an airbag sensor, said receiving area being located between said mounting portions and said bracket.

10. A component for the floor of an automobile, comprising:
    a one-piece middle part for connection to a main floor of an automobile; and
    at least three mounting portions fixedly connected to said middle part, each of said mounting portions including an opening on an upper side thereof for connection to a shift housing, said mounting portions projecting upwardly from the middle part and being spaced apart from one another to define an accommodation space therebetween.

11. A component according to claim 10, further comprising a bracket fixedly connected to said middle part, at least a portion of said bracket extending essentially perpendicularly to said middle part, said bracket being mounted rearward of said mounting portions.

12. A component according to claim 11, wherein said portion of said bracket includes at least one opening for connection to a hand brake lever.

13. A component according to claim 11, further comprising a bracket fixedly connected to said middle part, at least a portion of said bracket extending essentially perpendicularly to said middle part, said bracket being mounted rearward of said mounting portions.

14. A component according to claim 10, wherein a portion of said middle part is configured as a receiving area for connection to an airbag sensor.

15. A component according to claim 11, wherein a portion of said middle part is configured as a receiving area for connection to an airbag sensor, said receiving area being located between said mounting portions and said bracket.

16. A component according to claim 13, wherein a portion of said middle part is configured as a receiving area for connection to an airbag sensor, said receiving area being located between said mounting portions and said bracket.

* * * * *